(No Model.)
J. KLAUCKE.
Scissors.
No. 242,000. Patented May 24, 1881.
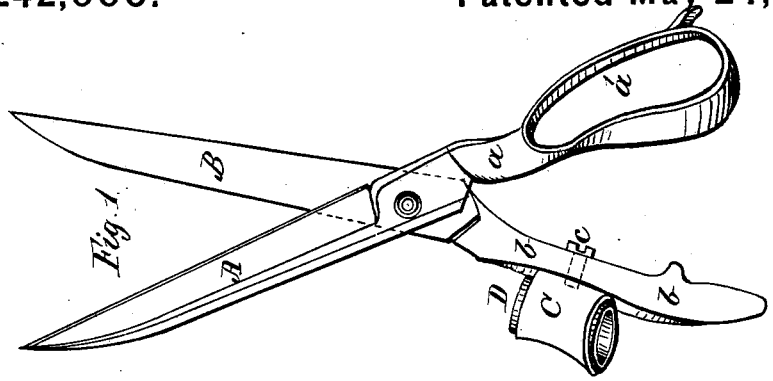
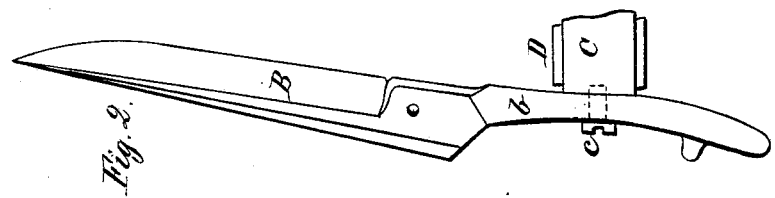
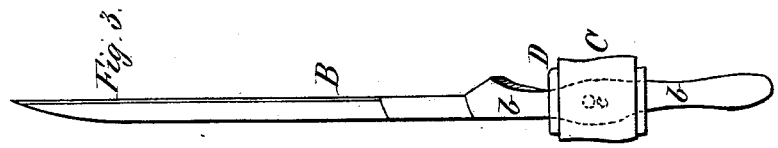
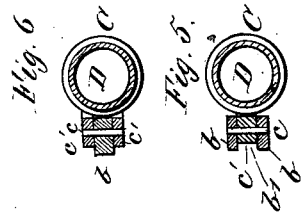
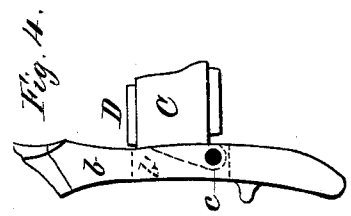
Witnesses.
Wm A. McElwee
H. A. Daniels
Inventor.
Julius Klaucke
pr Henry Orth
atty.
N. PETERS, Photo-Lithographer, Washington, D. C.

UNITED STATES PATENT OFFICE.

JULIUS KLAUCKE, OF SOLINGEN, GERMANY, ASSIGNOR TO THEODOR FISCHER, OF SAME PLACE.

SCISSORS.

SPECIFICATION forming part of Letters Patent No. 242,000, dated May 24, 1881.

Application filed April 1, 1881. (No model.)

*To all whom it may concern:*

Be it known that I, JULIUS KLAUCKE, a subject of the King of Prussia, residing at Solingen, in the German Empire, have invented certain new and useful Improvements in Scissors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in scissors or shears; and it consists, essentially, in the combination, with one of its legs, of a thumb sleeve or thimble, substantially as hereinafter described, and shown in the accompanying drawings, in which—

Figure 1 is a perspective view of a pair of scissors or shears illustrating my improvements; Figs. 2 and 3, front and edge views of the thumb-blades. Fig. 4 is a front view of part of said blades, and Figs. 5 and 6 are sections on the line of the pivot-pin of Fig. 4.

The object of my invention is to so construct the scissors or shears as to enable the person using them to apply the full muscular power of the thumb and arm in opening and closing the same, and provide a greater leverage, thereby diminishing the power necessary to close the blades during the action of cutting and avoid cramping of the hand, as is the case when shears of the ordinary construction are used for any length of time.

In the accompanying drawings, A represents the finger-blade, which is constructed, as usual, with a shank, $a$, and a bow, $a'$. The thumb-plate B, however, has no bow, but simply a shank, $b$, to which is attached, instead of the usual bow, a thumb sleeve or thimble, C, in any convenient manner, preferably by means of a screw, $c$. This sleeve or thimble C may be rigidly attached to the shank of blade B, or it may be pivoted thereto, so as to rotate upon the screw-pin $c$. For some descriptions of shears, especially those employed for cutting hard or heavy material, I prefer to hinge the thimble C to the shank $b$, and, as shown in Figs. 5 and 6, this may be effected by recessing or slotting the shank $b$, as at $b'$, Figs. 4 and 5, the sleeve C being provided with an ear or projection, $c'$; or, as shown in Fig. 6, the thimble C may be provided with two such ears or projections, $c'$, that fit over the opposite sides of the shank $b$, the pivot passing, in either case, through said shank and ear or ears, as will be readily understood. Any other suitable method may be adopted to connect the thimble C with its shank $b$, to adapt it to move thereon either around a pivot or laterally.

The thimble C is so constructed as to form a good bearing for the thumb, and in practice I line it with any suitable flexible material, D, Figs. 5 and 6.

Having now described my invention, what I claim is—

1. In scissors or shears, the combination, with the blade A, the shank of which is provided with the usual finger-bow, of the blade B, the shank of which is provided with a pivoted metallic thimble or sleeve for the thumb, instead of the usual bow, for the purposes specified.

2. In scissors or shears, the combination, with the blade A, the shank of which is provided with the usual finger-bow, of the blade B, the shank of which is provided with a pivoted metallic thimble or sleeve capable of motion toward and from the shank, for the purposes specified.

3. In scissors or shears, the combination, with the blade A, the shank of which is provided with the usual finger-bow, of the blade B, the shank of which is provided with a metallic thimble or sleeve having a flexible lining for the thumb, as and for the purposes specified.

In testimony whereof I affix my signature in presence of two witnesses.

JUL. KLAUCKE.

Witnesses:
 WALTHER FISCHER,
 AUG. SCHMITZ.